(12) United States Patent
Levecq et al.

(10) Patent No.: US 8,725,447 B2
(45) Date of Patent: May 13, 2014

(54) METHOD FOR CORRECTING A WAVE FRONT ANALYSER AND ANALYSER IMPLEMENTING SAID METHOD

(75) Inventors: Xavier Levecq, Gif sur Yvette (FR); Guillaume Dovillaire, Palaiseau (FR)

(73) Assignee: Imagine Optic, Orsay (FR)

( * ) Notice: Subject to any disclaimer, the term of this patent is extended or adjusted under 35 U.S.C. 154(b) by 533 days.

(21) Appl. No.: 12/445,715

(22) PCT Filed: Oct. 16, 2007

(86) PCT No.: PCT/FR2007/001689
§ 371 (c)(1),
(2), (4) Date: Oct. 12, 2010

(87) PCT Pub. No.: WO2008/046998
PCT Pub. Date: Apr. 24, 2008

(65) Prior Publication Data
US 2011/0134415 A1 Jun. 9, 2011

(30) Foreign Application Priority Data
Oct. 16, 2006 (FR) .................................. 06 09061

(51) Int. Cl.
*G01J 9/00* (2006.01)

(52) U.S. Cl.
USPC ........ 702/106; 702/66; 250/201.1; 250/201.9

(58) Field of Classification Search
CPC .............. G01J 9/00; G01J 9/02; G01J 9/0215
USPC ........................ 702/66, 106; 250/201.1, 201.9
See application file for complete search history.

(56) References Cited

U.S. PATENT DOCUMENTS

| | | | |
|---|---|---|---|
| 6,693,704 B1 * | 2/2004 | Ooki et al. | 356/121 |
| 7,065,256 B2 * | 6/2006 | Alon et al. | 382/264 |
| 7,864,333 B1 * | 1/2011 | Olczak et al. | 356/491 |
| 2002/0090650 A1 * | 7/2002 | Empedocles et al. | 435/7.1 |
| 2002/0145671 A1 * | 10/2002 | Alon et al. | 348/241 |
| 2004/0143565 A1 * | 7/2004 | Berger et al. | 707/1 |
| 2005/0024051 A1 * | 2/2005 | Doddrell et al. | 324/307 |
| 2005/0045801 A1 * | 3/2005 | Smith | 250/201.9 |
| 2005/0151960 A1 * | 7/2005 | Gerwe et al. | 356/121 |
| 2006/0261244 A1 * | 11/2006 | Topa | 250/201.9 |
| 2007/0083114 A1 * | 4/2007 | Yang et al. | 600/437 |
| 2007/0258707 A1 * | 11/2007 | Raskar | 396/52 |
| 2008/0035834 A1 * | 2/2008 | Gleckler | 250/208.1 |
| 2008/0144043 A1 * | 6/2008 | Wegmann et al. | 356/521 |
| 2009/0225407 A1 * | 9/2009 | Nakayama et al. | 359/370 |
| 2009/0276188 A1 * | 11/2009 | Cui et al. | 702/189 |

OTHER PUBLICATIONS

Amos Talmi et al., "Direct demodulation of Hartmann-Shack patterns", J. Opt. Soc. Am. A, Apr. 2004, pp. 1-8, vol. 21, No. 4, Optical Society of America.

(Continued)

*Primary Examiner* — Mohamed Charioui
*Assistant Examiner* — John Kuan
(74) *Attorney, Agent, or Firm* — Young & Thompson

(57) ABSTRACT

A method for correcting a wave front analyzer, in which the analyzer detects a signal from an incident wave front to be analyzed (FO), the detected signal providing phase and intensity local information. The method includes correcting the phase computation according to intensity space variations. A wave front analyzer for implementing the method is also described.

19 Claims, 4 Drawing Sheets

(56) References Cited

OTHER PUBLICATIONS

Sabrina Velghe et al., "Wave-front reconstruction from multidirectional phase derivatives generated by multilateral shearing interferometers", Optics Letters, Feb. 1, 2005, pp. 245-247, vol. 30, No. 3, Optical Society of America.

J. Primot et al., "Achromatic three-wave (or more) lateral shearing interferometer", J. Opt. Soc. Am. A, Dec. 1995, pp. 2679-2685, vol. 12, No. 12, Optical Society of America.

Yuval Carmon et al., "Phase retrieval by demodulation of a Hartmann-Shack sensor", Optics Communications, Jan. 2003, pp. 285-288, vol. 215, Elsevier Science B.V.

* cited by examiner

METHOD FOR CORRECTING A WAVE FRONT ANALYSER AND ANALYSER IMPLEMENTING SAID METHOD

CROSS REFERENCE TO RELATED APPLICATIONS

This application is a National stage application of PCT application PCT/FR 2007/001689 filed Oct. 16, 2007, which claims priority from French application 06 09061 filed Oct. 16, 2006.

BACKGROUND OF THE INVENTION

1. Technical Field

The present invention relates to a process for correcting a wavefront analyzer. It also relates to a wavefront analyzer in which this process is implemented.

The field of the invention is that of the wavefront analyzers functioning by direct measurement on a beam. The analyzers concerned are of the following types:
- Hartmann, comprising an array of holes arranged in front of an array detector, each hole forming, from an incident wavefront, a spot on the detector,
- Shack Hartmann or Hartmann Shack, comprising an array of microlenses arranged in front of an array detector, each microlens forming, from an incident wavefront, a spot on the detector, or
- Shearing interferometer (or multiple-wave interferometer), comprising means for generating spatially offset replicas of an incident wavefront and means for making the replicas interfere on an array detector in the form of interference spots or fringes.

2. State of the Prior Art

For all these analyzers, the position of the spots (the Hartmann or Shack Hartmann case) and the position of the interference fringes or of the interference spots (the case of the shearing interferometer) on the detector makes it possible to determine, by an interpretation of the energy signal received on the detector, the local gradients (the local derivatives) of the phase of the incident wavefront, which makes it possible to determine the curvature of the incident wavefront. However, if the shape the spots (or fringes) is disturbed by a local variation of intensity of the analyzed wavefront, the measurement of the local phase gradient is itself distorted.

A local variation of intensity gives rise to an error in the local measurement of the phase gradient of the wavefront.

In fact, in the case of the Hartmann system and with reference to FIG. 1, a variation of intensity at the scale of a micro-hole appears again on the spot measured by the array detector (typically CCD or CMOS) and the position of the energy barycentre of the spot is no longer the exact reflection of the movement of the spot related solely to the modification of the local phase gradient of the analyzed wavefront.

In the case where the incident phase on the micro-hole is flat, the result of the determination of the local phase gradient should give a zero gradient. However, the local variation of the intensity shifts the energy barycentre and the result of the computation gives a non-zero gradient. This difference is the error related to the variation of intensity in front of the micro-hole.

In the case of the Shack-Hartmann technology and with reference to FIGS. 2 and 3, the principle is very similar. However, the presence of microlenses changes the behaviour a little. In fact when the plane of the detector is in the focusing plane of a microlens, the position of the energy barycentre is not dependent on the distribution of intensity in front of the microlens.

In this configuration, the measurement of the phase gradient is completely independent of the intensity gradients. Unfortunately, this property is true only for a single operating position of the detector with respect to the microlenses, and for a given wavelength of the incident wave. The operating position is adjusted, in general, during the setup for collimated beams (zero local curvature in front of the microlens), i.e. the detector is placed in the focal plane of the microlenses. Document [1], referenced on the last page, can be mentioned on this matter.

However, when the beam exhibits aberrations (curvature, astigmatism, coma, spherical aberration, etc.), the local curvature of the wavefront in front of each microlens is no longer zero and the focusing point of the microlens is no longer in the plane of the detector. In this configuration, a variation of intensity in front of the microlens causes a modification of the position of the energy barycentre of the spot.

The error related to the local variation of intensity of the wavefront in front of each microlens therefore depends on the local curvature of the wavefront in front of said microlens. The further the focusing point is from the detector, the greater is the influence of the intensity distribution.

The influence of the variation of intensity on the determination of the local phase gradients of the wavefront in the case of the shearing interferometer (lateral shift interferometer) is very similar to the Hartmann technology case. In fact, the principle of the lateral shift interferometer is to make at least two replicas of the incident wave interfere with each other by shifting them laterally with respect to each other.

Documents [2] and [3] referenced on the last page can be mentioned in particular on this matter.

The interference phenomenon brings the phase term of the incident wave (that which is to be measured) into play and also the amplitude of the wave (related to the intensity). The interference pattern is therefore modified by a variation of intensity of the incident wavefront and the computation of the phase gradient is thereby disturbed.

A principal purpose of the present invention is to overcome these drawbacks by proposing a process for correcting a wavefront analyzer.

DESCRIPTION OF THE INVENTION

This objective is achieved by implementing a process for correcting a wavefront analyzer, this analyzer detecting a signal from an incident wavefront to be analyzed, said signal thus detected providing local phase and intensity information on the wavefront to be analyzed, characterized in that it comprises a correction of a computation of the phase of the wavefront to be analyzed as a function of a spatial intensity variation of the wavefront to be analyzed.

In this way a particularly effective way is available for taking into account the inevitable intensity variations observed in numerous optical sources.

The analyzer can implement a step of breaking down the wavefront to be analyzed into a plurality of spots or fringes on a detector.

Thus, the correction process according to the invention can typically be used for correcting:
- an analyzer of the Hartmann type, having an array of micro-holes, a analyzer of the Shack-Hartmann or Hartmann-Shack type, having an array of microlenses, a phase analyzer of the multiple-wave interferometer type, these examples not being limitative.

In a first embodiment, the correction can consist of a correction of a computation of local phase gradients of the wavefront to be analyzed (FO) as a function of local intensity gradients of the wavefront to be analyzed (FO). The process according to the invention can moreover comprise the following steps:

a measurement of the intensity of each spot or fringe, a determination of the local intensity gradients of the wavefront to be analyzed.

This determination of the local gradients makes it possible to map the local intensity gradients of the wavefront to be analyzed (for example in front of each micro-hole in the case of an analyzer of the Hartmann type, or in front of each microlens in the case of an analyzer of the Shack-Hartmann type). More generally, it is possible to determine a local intensity gradient from the intensity of a fringe or of a spot and from the intensities of the adjacent fringes or spots.

Preferably, the correction is made according to a correction law. This correction law can be known or determined experimentally or theoretically.

The first embodiment of the process according to the invention can comprise an experimental or theoretical determination of the correction law for the computation of local phase gradients of the wavefront to be analyzed as a function of the local intensity gradients of the wavefront to be analyzed. An experimental variant of this first embodiment comprises a calibration step for determining this correction law. This calibration step can advantageously comprise, before the detection of the signal from the wavefront to be analyzed, the following steps:

an injection, at the input of the analyzer, of a wavefront that is substantially homogeneous in intensity and the phase of which is known, an insertion, in front of the input of the analyzer, of a mask the transmission of which is not spatially homogeneous, such that the homogeneous wavefront passes through the mask before being broken down by the analyzer into a plurality of spots or fringes on the detector, an observation of the position of each one of the spots or fringes obtained on the detector in the presence of the mask, and a determination, from said observation, of the correction law to apply (preferably to each spot or fringe) for the computation of the local phase gradients of the wavefront to be analyzed as a function of the local intensity gradients of the wavefront to be analyzed.

The expression "wavefront of known phase" here and hereafter signifies a wavefront of which the shape or the phase is known by a user of the process according to the invention or by an analyzer, by a device or by software implementing the process according to the invention, this knowledge being able to be theoretical or resulting from a measurement; this wavefront can for example in a simple case be of flat phase. In the case of an analyzer of Shack-Hartmann type, the steps of the determination of the correction law must a priori be reiterated for several longitudinal positions, with respect to the detector, of the focusing plane of each spot (for example for different distances between the detector and the array of microlenses), the correction law for the computation of the local phase gradients of the wavefront to be analyzed as a function of the local intensity gradients of the wavefront to be analyzed a priori depending on this distance.

The first embodiment of the process according to the invention can moreover comprise, for the determination of the correction law, an observation of the position of each one of the spots or fringes obtained on the detector without the mask, this observation being able to serve as a reference.

In the first embodiment of the process according to the invention (and in general), the observation of the position of a spot or fringe can comprise a determination of the position of the energy barycentre of the spot or fringe on the detector.

A theoretical variant of the first embodiment of the process according to the invention can comprise a knowledge or a theoretical determination of the correction law for the computation of local phase gradients of the wavefront to be analyzed as a function of local intensity gradients of the wavefront to be analyzed, for example in the form of a computation algorithm, a formula or a computation table. In the case of a Shack-Hartmann analyzer, this law moreover depends, for each microlens, on the distance between the detector and the focusing point of the microlens, and therefore on the distance between the detector and the array of microlenses.

It is also possible, for an analyzer of the Shack-Hartmann type comprising an array of microlenses, to provide the following steps:

a mapping of local phase gradients of the wavefront to be analyzed, preferably in front of each microlens, a mapping of the local intensity gradients of the wavefront to be analyzed, preferably in front of each microlens, a determination from said local phase gradients, of a mapping of the local phase curvatures of the wavefront to be analyzed (for example by means of a derivation from said local phase gradients), a determination of a longitudinal position of the focusing plane of each one of the spots, for each spot, a correction for the computation of the local phase gradients, from the position of the focusing plane of the spot and from the mapping of the intensity gradients in front of each microlens, this correction being carried out by means of the correction law known experimentally using a calibration, or theoretically.

A second embodiment of the process according to the invention, preferably used for analyzers of Hartmann type or multiple-wave interferometers, can moreover comprise the following steps:

producing a Fourier transform of the unprocessed detected signal, an isolation of the zero order of the Fourier transform, producing an inverse Fourier transform of said isolated zero order in such a way as to obtain an intensity shape of the wavefront to be analyzed, a division of said unprocessed detected signal by said intensity shape.

A third embodiment of the process according to the invention, preferably used for analyzers of the Hartmann type, or multiple-wave interferometers, can moreover comprise the following steps:

producing a Fourier transform of the unprocessed detected signal, a step of deconvolution of first orders of the Fourier transform of the unprocessed signal by the zero order of the Fourier transform of the unprocessed signal, a reconstruction of the wavefront to be analyzed, corrected in terms of phase, from said deconvoluted first orders.

The reconstruction can for example consist of an inverse Fourier transform of the result of a function applied to said deconvoluted first orders.

For an analyzer of the Shack-Hartmann type, the correction process according to the invention can advantageously comprise, before the detection of the signal from the wavefront to be analyzed, an optimisation of the analyzer comprising:
- an injection, at the input of the analyzer, of a wavefront that is substantially homogeneous in intensity and whose phase is known,
- an insertion, in front of the input of the analyzer, of a mask the transmission of which is not spatially homogeneous, such that the homogeneous wavefront passes through the mask before being broken down by the analyzer into a plurality of spots on the detector,
- an observation of the position of each one of the spots obtained on the detector in the presence of the mask,
- a withdrawal of the mask from in front of the input of the analyzer,
- an observation, without the mask, of the position of each one of the spots obtained on the detector,
- a displacement of the detector with respect to the array of microlenses, and
- a reiteration of the preceding steps in order to minimize the difference in position of the spots between the observation without the mask and the observation in the presence of the mask.

Thus, the analyzer is optimized for wavefronts to be analyzed whose shape or phase is close to that of the wavefront the phase of which is known. The observation of the position of a spot or fringe can comprise a determination of the position of the energy barycentre of the spot or fringe on the detector.

According to another aspect of the invention, there is proposed a wavefront analyzer implementing a correction process according to the invention, comprising means for carrying out all or some of the previously described steps.

BRIEF DESCRIPTION OF THE DRAWINGS

Other advantages and characteristics of the invention will become apparent on examination of the detailed description of an embodiment which is in no way limitative, and the attached diagrams, in which.

DESCRIPTION OF PREFERRED EMBODIMENTS

Several examples of analyzers according to the invention implementing a correction process according to the invention will now be described with reference to the abovementioned figures.

Figure 4:
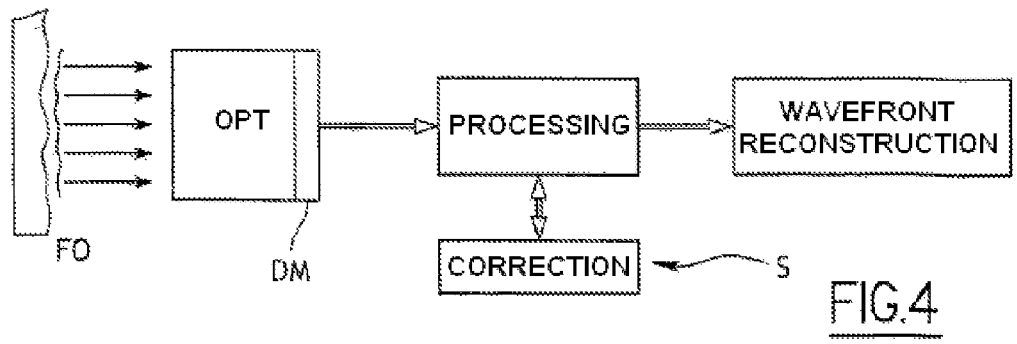
FIG. 4 diagrammatically represents a system for wavefront analysis and reconstruction implementing a correction process according to the invention.

A system for wavefront analysis and reconstruction typically comprises, with reference to FIG. 4:
- an optical device OPT equipped with an array detector DM and placed in front of an optical source whose wavefront FO is to be analyzed,
- a processing unit S processing the signals originating from the array detector DM and in which a software dedicated to wavefront analysis and reconstruction is executed, such as an already commercially available software.

In the rest of this document, it will be considered that the array detector DM is substantially contained in a plane formed by two substantially perpendicular axes X and Y. The correction process according to the invention is implemented in practice in the form of a correction software module cooperating with the wavefront analysis and reconstruction software.

Figure 1:
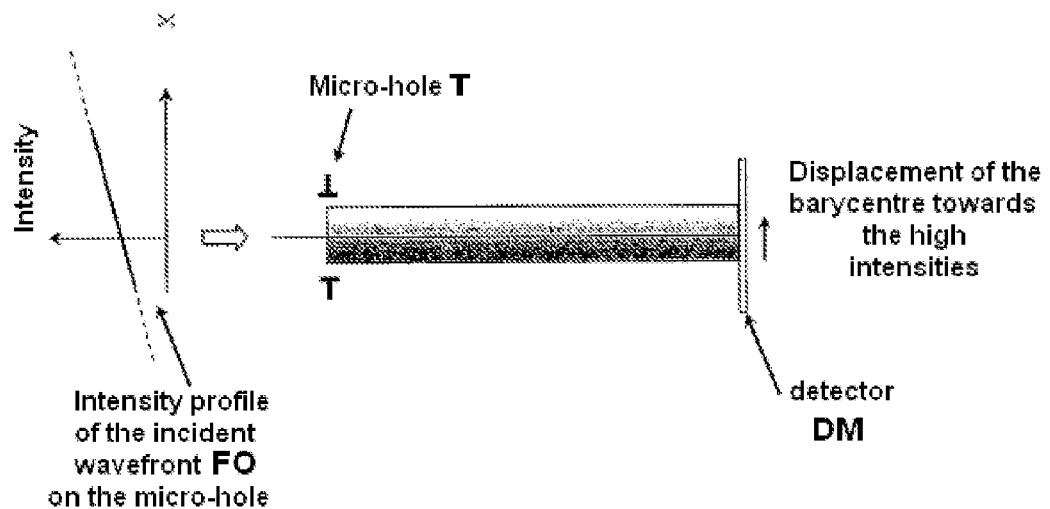
FIG. 1 illustrates a wavefront the intensity of which in front of a micro-hole of a Hartmann type analyzer is not homogeneous, which causes a displacement towards the high intensities of the position of the energy barycentre of the spot created by the micro-hole on a detector.
Figure 6:
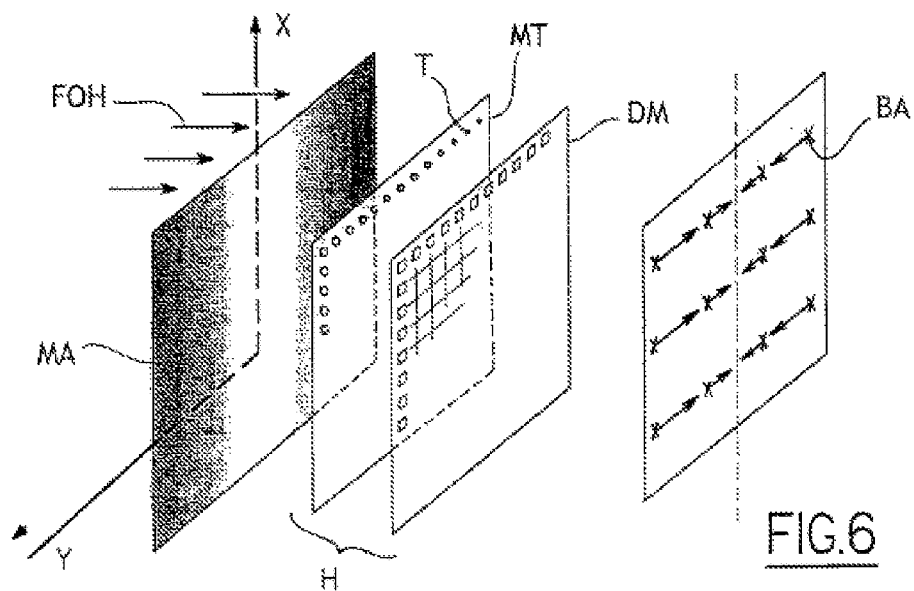
FIG. 6 diagrammatically represents a Hartmann wavefront analyzer in front of which a mask has been placed the transmission of which is not spatially homogeneous.

In the case of an analyzer of the Hartmann type, with reference to FIGS. 1 and 6, the optical device H comprises an array MT of micro-holes T and the array detector DM arranged substantially parallel. The array of micro-holes breaks down an incident wavefront FO into an array of spots projected onto the detector DM, each spot being associated with a micro-hole. The signal detected by the detector provides local phase and intensity information on the wavefront FO to be analyzed.

Figure 2:
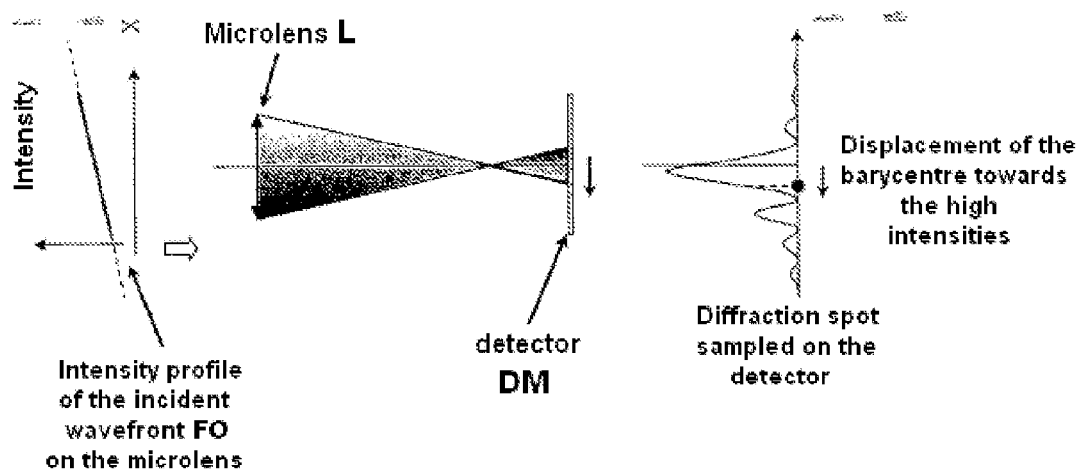
FIG. 2 illustrates a wavefront the intensity of which in front of a microlens of a Shack Hartmann type analyzer is not homogeneous, which causes a displacement towards the high intensities of the position of the energy barycentre of the spot created by the microlens on a detector.
Figure 3:
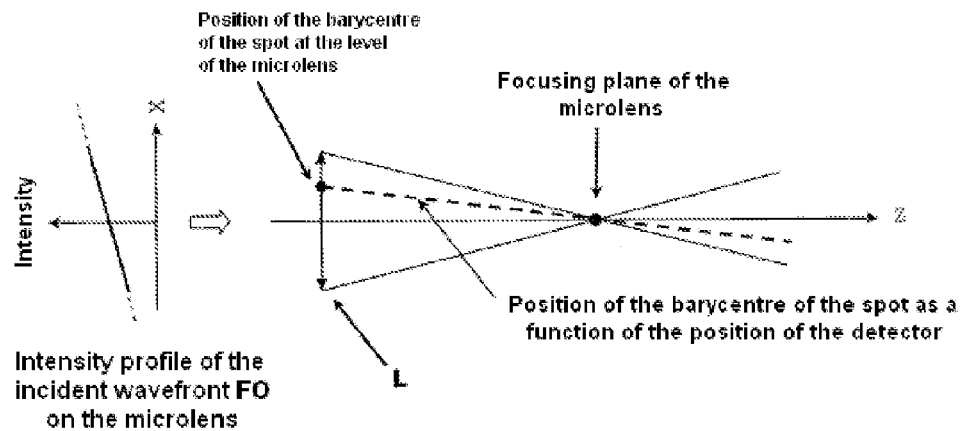
FIG. 3 illustrates, for the Shack Hartmann analyzer illustrated in FIG. 2, the position of the barycentre of the spot as a function of the position of the detector with respect to the microlens.
Figure 5:
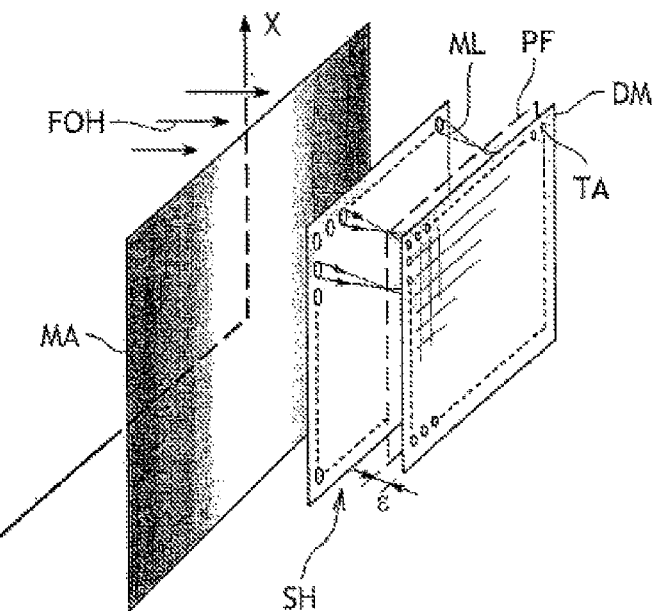
FIG. 5 diagrammatically represents a Shack-Hartmann wavefront analyzer in which the focusing plane of the microlenses is not merged with the plane of the array detector and in front of which a mask has been placed the transmission of which is not spatially homogeneous.

In the case of an analyzer of the Shack-Hartmann type, with reference to FIGS. 2, 3 and 5, the optical system SH comprises an array ML of microlenses L and an array detector DM on which a plurality of optical spots TA is detected, each optical spot corresponding to a microlens. In such a system, the focusing plane PF of the array of microlenses frequently does not merge with the plane of the array detector.

In the case of an analyzer of the multiple-wave interferometer type, the optical system comprises means for generating replicas of an incident wavefront FO, means for shifting the replicas spatially, and means for making the replicas interfere on the array detector DM. Depending on the number of interfering replicas, the incident wavefront is broken down on the detector into an array of spots or into a series of interference fringes. The signal detected by the detector provides local phase and intensity information on the wavefront FO to be analyzed.

Figure 9:
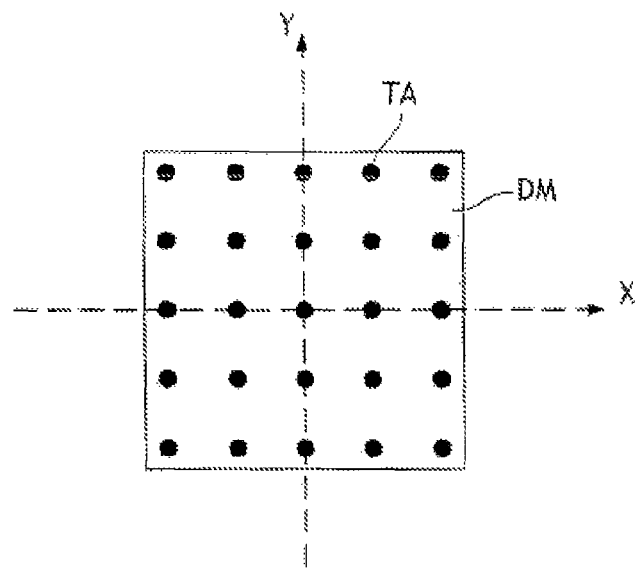
FIG. 9 illustrates an unprocessed signal obtained from an analyzer generating an array of spots, for example by four-wave multiple-wave interferometer technology.
Figure 10:
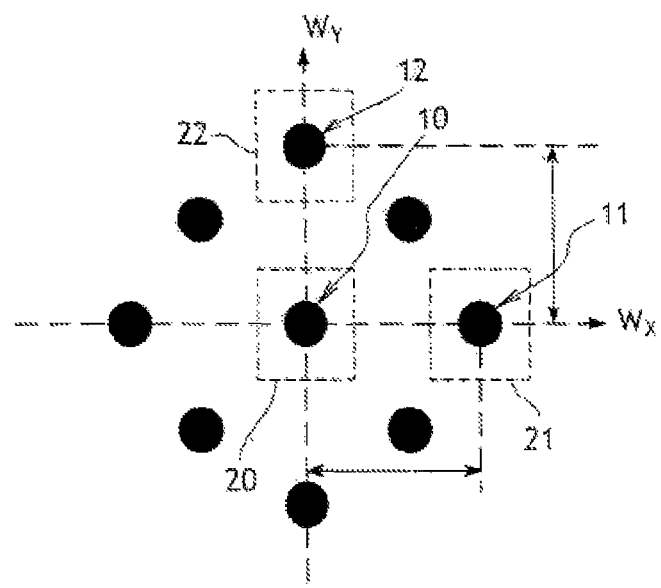
FIG. 10 illustrates the Fourier transform of the unprocessed signal shown in FIG. 9.

In the case of multiple-wave interferometer technology generating an array of spots (for example a three or four-wave interferometer), or in the case of the Hartmann technology, also generating an array of spots, one embodiment of the process according to the invention consists of "rectifying" the unprocessed signal. An unprocessed signal obtained from one of these technologies is shown in FIG. 9. This signal consists of an array of spots TA aligned on the array detector DM in lines along the X axis and in columns along the Y axis (a spot is understood here to be a peak of the intensity of the detected unprocessed signal). The intensity I of these spots is not necessarily homogeneous in the X and Y directions. In order to analyze an incident wavefront, the Fourier transform of the unprocessed signal detected by the detector is produced. The signal shown in FIG. 10 is then obtained as a function of the spatial frequencies Wx and Wy, Wx being the spatial frequency associated with X and Wy being the spatial frequency associated with Y. The Fourier transform, as a function of Wx and Wy, comprises several spots (a spot is here understood to be a peak of the value of the Fourier transform) of which:

a central spot 10 for which Wx and Wy are substantially zero or at least close to zero, called the zero order of the Fourier Transform, a spot 11 directly adjacent to the zero order along the Wx axis, and for which Wy is substantially zero or at least close to zero; this spot is a first order of the Fourier transform;

a spot 12 directly adjacent to the zero order along the Wy axis, and for which Wx is substantially zero or at least close to zero; this spot is also a first order of the Fourier Transform;

The zero order contains information on the shape of the intensity of the incident wavefront FO, and therefore contains information on the local intensity variations of the incident wavefront. The zero order is isolated, for example by means of a low pass filter (represented by the frame 20 in FIG. 10) which removes from the Fourier transform all of its values for absolute values of Wx greater than a given value and for absolute values of Wy greater than a given value. An inverse Fourier transform of this isolated zero order is produced in order to obtain the shape of the intensity of the incident wavefront and the unprocessed signal is divided by the intensity shape previously computed for the isolated zero order. This operation "rectifies" the unprocessed signal and eliminates the influence of the variations of intensity for the computation, from the signal, of the local phase gradients of the incident wavefront.

In a formalism of wavefront reconstruction by the so-called "Fourier" method, where the first orders of the result of the Fourier transform of the unprocessed signal (which contain information on the local phase gradients of the wavefront) are used for extracting the phase information, it is also possible to introduce a step of deconvolution of the first orders by the zero order before proceeding to the reconstruction of the wavefront.

In order to deconvolute the first orders by the zero order, it is possible:

to isolate the zero order for example by means of a low pass filter (represented by frame 20 in FIG. 10) which removes from the Fourier transform all of its values for absolute values of Wx greater than a given value and for absolute values of Wy greater than a given value;

to isolate the first order 11 by means of a filter represented by frame 21 in FIG. 10, this filter selecting values of the Fourier transform which belong solely to this first order 11, to isolate the first order 12 by means of a filter centred on the Wy axis and represented by frame 22 in FIG. 10, this filter selecting values of the Fourier transform which belong solely to this first order 12, and to deconvolute the isolated first orders by the isolated zero order.

The reconstruction of the wavefront can for example consist of an inverse Fourier transform of the result of a function applied to said deconvoluted first orders. The function applied is a function used in a standard fashion for extracting phase information from first orders. Such functions are described in the references [1] to [4].

It is possible to adopt another approach for eliminating the influence of the local intensity variations of a wavefront to be analyzed on the computation of the local phase gradients of the wavefront to be analyzed. In fact, for the case of the Hartmann technology in particular, a local and geometric approach can be used. In fact, to a first approximation, the spot formed on the detector DM by the passage of the part of the wavefront FO intercepted by a hole T undergoes a parasitic displacement related to the variation of the intensity in front of said hole equal to the displacement of the energy barycentre computed in the plane of the hole. As a result, knowledge of the variation of intensity in the plane of the hole allows computation of the displacement of the energy barycentre of the wavefront intercepted by the hole with respect to the centre of the hole. This displacement value is the value that must be subtracted from the position of the barycentre of the spot formed on the array detector (for example CMOS "Complementary Metal-Oxide-Semiconductor" or CCD "Charge Coupled Device") by said hole in order to eliminate the error generated by the variation of intensity. In order to determine the local variation of the intensity of the wavefront, the intensity measured in the spots originating from of the micro-holes is used. In fact, if the wavefront locally exhibits a stronger intensity the spots formed on the array detector by the holes intercepting this zone of the wavefront will themselves be more intense and the relationship linking the intensity of these spots to the local intensity of the wavefront is perfectly linearly proportional. Thus the measurement of the intensity of each spot originating from the micro-holes makes it possible to produce a complete mapping of the intensity distribution of the wavefront measured with a spatial resolution equal to the sampling defined by the array of micro-holes. This mapping can then be used for determining the local variation of the intensity in front of each micro-hole. The intensity gradients are given by the derivative of the intensity map of the measured wavefront. These intensity gradients are then used for determining the variation of position of the energy barycentre of the spots generated by the local intensity variation of the measured wavefront.

It is possible for example to use the formulae:

$$b_{intensity}^X(i, j) = K * \frac{\Delta I^X(i, j)}{I(i, j)}$$

$$b_{intensity}^Y(i, j) = K * \frac{\Delta I^Y(i, j)}{I(i, j)}$$

$b_{intensity}^X(i,j)$ and $b_{intensity}^Y(i,j)$ being the variation, generated by the local intensity variation of the measured wavefront, and in the X or Y direction respectively, of the position of the energy barycentre of the spot associated with the micro-hole situated in line i and column j of the array of micro-holes;

I(i, j) being the intensity of the spot originating from the micro-hole situated in line i and column j of the array of micro-holes;

$\Delta I^X(i,j)$ and $\Delta I^Y(i,j)$ being the local intensity variation of the wavefront, in the X or Y direction respectively, and in front of the micro-hole situated in line i and column j of the array of micro-holes;

$$\frac{\Delta I^X(i,j)}{I(i,j)}$$

(for example equal to $$\frac{I(i+1,j)-I(i-1,j)}{2I(i,j)}) \text{ and } \frac{\Delta I^Y(i,j)}{I(i,j)}$$

(for example equal to $$\frac{I(i,j+1)-I(i,j-1)}{2I(i,j)})$$

being the contrast of intensity, in the X or Y direction respectively, and seen through the micro-hole situated in line i and column j of the array of micro-holes;
K being a coefficient determined theoretically or experimentally.
It is thus possible to determine $b_{phase}{}^X(i,j)$ and $b_{phase}{}^Y(i,j)$ the variation, generated by the local phase variation of the measured wavefront, in the X or Y direction respectively, of the position of the energy barycentre of the spot associated with the micro-hole situated in line i and in column j of the array of micro-holes. It is possible, for example, to use the formulae:

$$b_{phase}{}^X(i,j) = b_{measured}{}^X(i,j) - b_{intensity}{}^X(i,j)$$

$$b_{phase}{}^Y(i,j) = b_{measured}{}^Y(i,j) - b_{intensity}{}^Y(i,j)$$

$b_{measured}{}^X(i,j)$ and $b_{measured}{}^Y(i,j)$, being the variation, in the X or Y direction respectively, of the position of the energy barycentre of the spot associated with the micro-hole situated in line i and column j of the array of micro-holes and measured by the detector.
Similarly, it is possible to determine $E^X(i,j)$ and $E^Y(i,j)$, the computational error, executed by the dedicated analysis software, of the derivative of the phase in the X or Y direction respectively and in front of the micro-hole situated in line i and column j of the array of micro-holes. This determination can for example be carried out by means of a formula which depends on the contrast $$\frac{\Delta I^X(i,j)}{I(i,j)} \text{ or } \frac{\Delta I^Y(i,j)}{I(i,j)}$$

respectively and on a coefficient $C_{c-p}$ determined theoretically or experimentally:

$$E^X(i,j) = C_{c-p} * \frac{\Delta I^X(i,j)}{I(i,j)}$$

$$E^Y(i,j) = C_{c-p} * \frac{\Delta I^Y(i,j)}{I(i,j)}$$

It is then possible to determine a corrected value $P_{real}{}^X(i,j)$ and $P_{real}{}^Y(i,j)$ of the derivative of the phase in the X or Y direction respectively and in front of the micro-hole situated in line i and column j of the array of micro-holes. It is for example possible to use the formulae:

$$P_{real}{}^X(i,j) = P_{measured}{}^X(i,j) - E^X(i,j)$$

$$P_{real}{}^Y(i,j) = P_{measured}{}^Y(i,j) - E^Y(i,j)$$

$P_{measured}{}^X(i,j)$ and $P_{measured}{}^Y(i,j)$ being the derivative of the phase, in the X or Y direction respectively, and in front of the micro-hole situated in line i and in column j of the array of micro-holes, computed by the dedicated analysis software.

Thus, in practice, the correction software is arranged so as to cooperate with the wavefront analysis and reconstruction software.

In order to determine experimentally a correction coefficient such as K or $C_{c-p}$, it is possible to proceed as illustrated in FIG. 6: a wavefront FOH is injected at the input of the analyzer which is substantially homogeneous in intensity and the phase of which is known (theoretically or experimentally), and a mask MA is inserted in front of the input of the analyzer the transmission of which is not spatially homogeneous.

Figure 7:
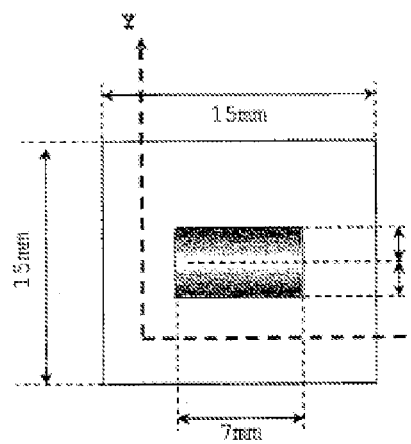
FIG. 7 is a front view of the mask shown in FIGS. 5 and 6.
Figure 8:
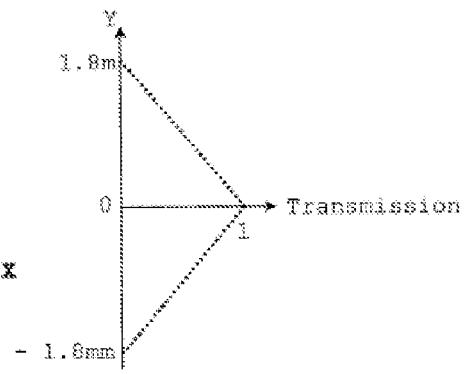
FIG. 8 is a view of the transmission profile of the mask shown in FIGS. 5 and 6.

The mask used will be described with reference to FIGS. 7 and 8. Along a principal axis Y, the mask has a roof-shaped optical transmission profile, the optical transmission of the mask increasing substantially linearly from 0 to 1 from the edges of the mask to the centre of the mask. Along an X axis, perpendicular to the Y axis, the mask has a constant optical transmission. In one non-limiting embodiment, the mask is for example rectangular, of length 7 mm along the X axis and of length 3.6 mm along the Y axis, and is inserted in a plate of BK7 type glass with an anti-reflection treatment and having a side dimension of 15 mm.

The mask is centred on the array of holes. For convenience, the X axis of the mask is parallel with the X direction as defined in the above equations, and therefore with the alignment of the lines of micro-holes, and the Y axis of the mask is parallel with the Y direction as defined in the above equations, and therefore with the alignment of the columns of micro-holes. The homogeneous wavefront FOH passes through the mask and, along of the Y axis, the contrast $$\frac{\Delta I^Y(i,j)}{I(i,j)}$$

is greater at the edges of the array of micro-holes and zero at the centre, and of opposite sign on the two sides of the centre of the array (corresponding to a maximum transmission of the mask). As illustrated in FIG. 6, the displacement of the position BA of the energy barycentre of each
one of the spots obtained on the detector DM in the presence of the mask takes place parallel to the Y axis and towards the centre of the detector, and is greater at the edges of the detector than at the centre of the detector.

The choice of a roof-shaped transmission rather than a linear transmission from 1 to 0 over the whole of the array of microlenses, makes it possible to overcome the possible tilt introduced by the transmission mask itself, in the case where its two faces would not be perfectly parallel.

The detector makes it possible to produce a mapping of the intensity and therefore of the intensity gradients of the wavefront having passed through the mask, and therefore makes it possible to determine the contrast of the intensity in front of each one of the holes.

An observation of the displacement of the position of the energy barycentre of each one of the spots obtained on the detector in the presence of the mask therefore makes it possible to determine the coefficient K (linking the contrast in front of a hole to the variation, generated by this contrast, of the position of the energy barycentre of a spot originating from this micro-hole) or $C_{c-p}$ (linking the contrast in front of a hole to the computational error of the derivative of the phase in front of the micro-hole). This observation therefore makes it possible to determine, for any wavefront to be analyzed, the correction to apply to each spot for the computation of the local phase gradients as a function of the local intensity gradients.

For an analyzer for which the position of the energy barycentre of each one of the spots obtained on the detector without the mask and from a wavefront that is homogeneous in intensity and of any phase whatsoever is not known, it is possible moreover to carry out, as a reference, an observation of the position of each one of the spots or fringes obtained on the detector without the mask. This can be the case if the analyzer is not calibrated or if the wavefront to be analyzed has an unknown phase distribution.

It is also possible to determiner a correction coefficient such as K or $C_{c-p}$ theoretically.

The expression of the displacement of the spot on the array sensor is:

$$b_{intensity}^{X}(i,j) = p_{i,j}^{X}(0)$$

$$b_{intensity}^{Y}(i,j) = p_{i,j}^{Y}(0)$$

$p_{i,j}^{X}(0)$ or $p_{i,j}^{Y}(0)$ represents the variation of the position of the energy barycentre in the plane of the array of micro-holes at the level of the micro-hole (i,j) on the X axis and on the Y axis respectively. For the computation of $p_{i,j}^{X}(0)$ or $p_{i,j}^{Y}(0)$, it is considered that the microlens i,j sees a contrast of intensity $dI/I$ ($dI^{X}/I$ on the X axis and $dI^{Y}/I$ on the Y axis respectively):

$$\frac{dI}{I} = \frac{I_{i+1,j} - I_{i-1,j}}{2I} = \frac{I_{i+1,j} - I_{i-1,j}}{I_{i+1,j} + I_{i-1,j}}$$

The barycentre is given by:

$$p_{i,j} = \frac{\sum_j \sum_i iPix(i, j)}{\sum_j \sum_i Pix(i, j)}$$

Which results in:

$$p_{i,j}(0) = D_{\mu l} \frac{1}{12} \frac{dI}{I}$$

From which:

$$K = D_{\mu l} \frac{1}{12}$$

The error in the computation of the local slope is obtained by dividing the error linked with the displacement of the spot on the sensor by the distance $Z_{sensor}$ separating the latter from the plane of the holes of the array of micro-holes.

Therefore the error in slope is:

$$E^{X}(i,j) = \frac{p_{i,j}^{X}(0)}{Z_{sensor}} = \frac{1}{Z_{sensor}} D_{\mu l} \frac{1}{12} \frac{dI^{X}(i,j)}{I}$$

$$E^{Y}(i,j) = \frac{p_{i,j}^{Y}(0)}{Z_{sensor}} = \frac{1}{Z_{sensor}} D_{\mu l} \frac{1}{12} \frac{dI^{Y}(i,j)}{I}$$

Thus the Parameter $C_{c-p}$ is:

$$C_{c-p} = \frac{1}{Z_{sensor}} D_{\mu l} \frac{1}{12}$$

In the case of an analyzer of the Shack-Hartmann type, with reference to FIGS. 2, 3 and 5, it is possible to optimize the wavefront analyzer. For this purpose it is possible to try to position the detector in the focusing plane of the array of microlenses. For this purpose the following steps can be carried out before the analysis of a wavefront FO to be analyzed:
   an injection, at the input of the analyzer, of a wavefront FOH that is substantially homogeneous in intensity and the phase of which is known,
   an insertion in front of the input of the analyzer of a mask MA the transmission of which is not spatially homogeneous, such that the homogeneous wavefront passes through the mask before being broken down by the analyzer into a plurality of spots on the detector,
   an observation of the position of each one of the spots obtained on the detector in the presence of the mask,
   a withdrawal of the mask from in front of the input of the analyzer,
   an observation without the mask of the position of each one of the spots obtained on the detector,
   a displacement of the detector with respect to the array of microlenses, and
   a reiteration of the preceding steps whilst minimizing the difference in position of the spots between the observation without the mask and the observation in the presence of the mask.

The mask makes it possible to display the effect of local intensity gradients of a wavefront on the computation of the local phase gradients of this wavefront. By displacing the detector, this effect is minimized by seeking to place the detector in the focal plane of the array of microlenses. In this way the computation of the local phase gradients carried out by the analyzer is corrected. However, this correction is valid only for a wavefront to be analyzed that is close (in wavelength, in phase etc.) to the homogeneous wavefront FOH used for adjusting the position of the detector in the focal plane PF. Preferably, a mask as illustrated in FIGS. 7 and 8 and already described previously will be used.

In the case of the Shack Hartmann, it is also possible to adopt a correction approach for eliminating the influence of the local intensity gradients of a wavefront to be analyzed on the computation of the local phase gradients of the wavefront to be analyzed. This correction process contributes to generating the correction data depending on the distance between the focusing plane PF and the array detector. The correction of the influence of the intensity distribution of the wavefront measured in the context of the Shack Hartmann technology is a little more complex to analyze than in the Hartmann case because it brings the computation of the local curvatures into play. The correction process therefore becomes iterative.

1. A mapping of the local phase gradients of a wavefront to be analyzed FO is produced, as well as a mapping of the distribution of the intensity (for example as described for the Hartmann case).

2. A derivation from the local phase gradients makes it possible to determine a mapping of the local curvatures of the wavefront to be analyzed. From the mapping of the local curvatures, the longitudinal position of the focusing plane of each one of the spots is easily determined.

3. The simultaneous knowledge of the position of the focusing plane of each spot as well as the mapping of the intensity gradients in front of each microlens (being able to be determined in the same way as for the Hartmann case) makes it possible to determine the correction to be applied to the position of each of the spots.

4. The local phase gradients having changed due to the correction carried out in point 3, the mapping of the local curvatures is itself modified, giving rise to a change in the computed longitudinal position of the focusing plane of each one of the spots. The computation must therefore be iterative over the steps 1, 2 and 3.

Regarding step 3, there are in fact several ways of determining the correction to be applied to the position of each of the spots or to the computation of the local phase gradients. It is possible for example to use formulae comparable to the formulae given previously for an analyzer of the Hartmann type, each micro-hole being replaced by a microlens, and the coefficients K and $C_{c-p}$, being replaced by the coefficients $K'(i,j)$ and $C'_{c-p}(i,j)$ respectively which depend not only on the wavelength of the wavefront to be analyzed but also on the distance between, on the one hand, the focusing plane of the microlens situated in line i and in column j and, on the other hand, the detector.

A so-called theoretical way consists of determining the formulae used or the coefficients $K'(i,j)$ and $C'_{c-p}(i,j)$ from a modelling and from putting physical phenomena into an equation. The expression of the displacement of the spot on the array sensor is:

$$b^X_{intensity}(i,j) = \frac{p^X_{i,j}(0)}{foc} * (foc - Z_{sensor})$$

$$b^Y_{intensity}(i,j) = \frac{p^Y_{i,j}(0)}{foc} * (foc - Z_{sensor})$$

$Z_{sensor}$ is the distance separating the sensor from the principal image plane of the array of microlenses.

$p^X_{i,j}(0)$ or $p^Y_{i,j}(0)$ represents the variation of the energy barycentre in the plane of the array of microlenses at the level of the microlens (i,j) on the X axis and on the Y axis respectively.

foc is the distance separating the principal image plane of the array of microlenses from the focusing plane of the microlens (i,j) in question.

For the computation of $p^X_{i,j}(0)$ or $p^Y_{i,j}(0)$, it is considered that the microlens i,j sees a contrast of intensity dI/I ($dI^X/I$ on the X axis and $dI^Y/I$ on the Y axis respectively):

$$\frac{dI}{I} = \frac{I_{i+1,j} - I_{i-1,j}}{2I} = \frac{I_{i+1,j} - I_{i-1,j}}{I_{i+1,j} + I_{i-1,j}}$$

The barycentre is given by:

$$p_{i,j} = \frac{\sum_j \sum_i iPix(i,j)}{\sum_j \sum_i Pix(i,j)}$$

This results in $$p_{i,j}(0) = D_{\mu l} \frac{1}{12} \frac{dI}{I}$$

Where $D_{\mu l}$ is the diameter (or dimension) of a microlens. We therefore have:

$$b^X_{intensity}(i,j) = \frac{p^X_{i,j}(0)}{foc} * (foc - Z_{sensor})$$
$$= \frac{(foc - Z_{sensor})}{foc} D_{\mu l} \frac{1}{12} \frac{dI^X(i,j)}{I}$$

$$b^Y_{intensity}(i,j) = \frac{p^Y_{i,j}(0)}{foc} * (foc - Z_{sensor})$$
$$= \frac{(foc - Z_{sensor})}{foc} D_{\mu l} \frac{1}{12} \frac{dI^Y(i,j)}{I}$$

Thus' the parameter K' is given by:

$$K' = \frac{(foc - Z_{sensor})}{foc} D_{\mu l} \frac{1}{12}$$

The error in the computation of the local slope is obtained by dividing the error linked with the displacement of the spot on the sensor by the distance $Z_{sensor}$ separating the latter from the principal image plane of the array of microlenses. We therefore have for the expression of E(i,j) for the X and Y axes:

$$E^X(i,j) = \frac{p^X_{i,j}(0)}{foc * Z_{sensor}} * (foc - Z_{sensor})$$
$$= \frac{(foc - Z_{sensor})}{foc * Z_{sensor}} D_{\mu l} \frac{1}{12} \frac{dI^X(i,j)}{I}$$

$$E^Y(i,j) = \frac{p^Y_{i,j}(0)}{foc * Z_{sensor}} * (foc - Z_{sensor})$$
$$= \frac{(foc - Z_{sensor})}{foc * Z_{sensor}} D_{\mu l} \frac{1}{12} \frac{dI^Y(i,j)}{I}$$

The parameter $C'_{c-p}$ thus becomes:

$$C'_{c-p} = \frac{(foc - Z_{sensor})}{foc * Z_{sensor}} D_{\mu l} \frac{1}{12}$$

All of the distances are considered positive in the direction of propagation of the light, i.e. from the array of microlenses towards the array sensor. The correction is obviously opposite to the error.

A so-called practical way consists of determining the formulae used or the coefficients K'(i,j) and C'$_{c-p}$(i,j) experimentally. Experimentally, the following is found:

$$p_{i,j}(0) = D_{\mu l} \frac{1}{16} \frac{dI}{I}$$

which is not entirely equal to the result of the theoretical determination. However, the expression computed theoretically already provides a good correction. The coefficients K'(i,j) and C'$_{c-p}$(i,j) can for example be determined in the same way as for a Hartman analyzer using a mask the transmission of which is not spatially homogeneous: a collimated beam is used (wavefront homogeneous in intensity and flat), the measurement operation is repeated successively without a mask and with a mask, the intensity gradients of the wavefront at the input of the analyzer when it has passed through the mask is determined for each spot and therefore each microlens, the displacement of the energy barycentres of each spot due to the local intensity gradients between the measurement without mask and the measurement with mask is measured, and the correction coefficients K'(i,j) and C'$_{c-p}$ (i, j) are determined experimentally. These measurements are repeated for different longitudinal positions, with respect to the detector, of the focusing plane of each spot (for example by varying the distance between the detector and the array of microlenses). In this way there is determined, for a wavefront to be analyzed, the correction to apply to each spot for the computation of the local phase gradients as a function of the local intensity gradients, and as a function of the position of the focusing point of the array of microlenses with respect to the array sensor. Thus, for the Shack-Hartmann case, the correction law is a function with two variables, unlike the Hartmann case for which the correction law is a function with one variable.

Of course, the invention is not limited to the examples which have just been described and numerous adjustments can be made to these examples without exceeding the scope of the invention.

The correction process according to the invention can in particular be implemented in wavefront measurements on optical systems incorporating lasers, and for the characterization of optical systems having transmission variation and of non-homogeneous optical sources.

It can therefore be implemented in optical and laser metrology, in ophthalmology, in adaptive optics and in astronomy.

REFERENCES

[1] article "Direct demodulation of Hartmann-Shack patterns" by Amos Talmi et al., published in J. Opt. Soc. Am. A, Vol. 21, No. 4, April 2002.
[2] article "Wave-front reconstruction from multidirectional phase derivatives generated by multilateral shearing interferometers", by Sabrina Velghe et al., published in Optics Letters Vol. 30, No. 3, 1st February 2005.
[3] article "Achromatic three-wave (or more) lateral shearing interferometer", by J. Primot et al., published in J. Opt. Soc. Am. A, Vol. 12, No. 12, December 1995.
[4] article "Phase Retrieval by demodulation of a Hartmann-Shack sensor", by Y. Carmon et al., published in Optics Communications, Vol. 215, pages 285-288, January 2003.

The invention claimed is:

1. A process for correcting a wavefront analyzer that detects a signal from an incident wavefront to be analyzed (FO), said signal thus detected providing local phase and intensity information on the wavefront to be analyzed, the process comprising:
    calculating local spatial gradients of an intensity of the wave front to be analyzed, in at least one spatial direction and at a given time, each local spatial gradient of the intensity at a given spatial position being calculated from intensity values, taken at different spatial positions but only at the given time, of the wavefront to be analyzed;
    correcting, with a correction module attached to and cooperating with the wavefront analyzer, a computation of a phase of the wavefront to be analyzed (FO) as a function of the local spatial gradients, at the given time, of the intensity of the wavefront to be analyzed (FO), but not as a function of other local spatial gradients, at another time, of the intensity of the wavefront to be analyzed (FO).

2. The process according to claim 1, further comprising the wavefront analyzer breaking down the wavefront to be analyzed (FO) into a plurality of spots (TA) or fringes on a detector (DM).

3. The process according to claim 2, wherein the correcting step includes correcting a computation of local phase gradients of the wavefront to be analyzed (FO) as a function of local intensity gradients of the wavefront to be analyzed (FO).

4. The process according to claim 3, further comprising:
    measuring an intensity of each spot (TA) or fringe, and
    determining the local intensity gradients of the wavefront to be analyzed (FO).

5. The process according to claim 3, wherein the correcting of the computation is carried out according to a correction law.

6. The process according to claim 1, wherein the wavefront analyzer is of the Hartmann type having an array (MT) of micro-holes (T).

7. The process according to claim 1, wherein the wavefront analyzer is a phase analyzer of the multiple-wave interferometer type.

8. The process according to claim 2, wherein the wavefront analyzer is of the Shack-Hartmann or Hartmann-Shack type having an array (ML) of microlenses (L).

9. The process according to claim 1, wherein calculating local spatial gradients of the intensity of the wave front to be analyzed comprises:
    calculating local spatial gradients of the intensity of the wave front to be analyzed in a first spatial direction and at the given time, and
    calculating local spatial gradients of the intensity of the wave front to be analyzed in a second spatial direction and at the given time.

10. The process according to claim 1, wherein the process comprises:
    calculating local gradients of the phase of the wave front to be analyzed, in at least one spatial direction and at the given time,
    determining, from said calculated local phase gradients, a mapping of the local phase of the wavefront to be analyzed, and
    correcting a computation of the local phase gradients, from the mapped local phase of the wavefront and from the calculated local spatial gradients of the intensity of the wavefront to be analyzed (FO).

11. A process for correcting a wavefront analyzer that detects a signal from an incident wavefront to be analyzed (FO), said signal thus detected providing local phase and intensity information on the wavefront to be analyzed, the process comprising:

correcting, with a correction module attached to and cooperating with the wavefront analyzer, a computation of a phase of the wavefront to be analyzed (FO) as a function of a local spatial intensity variation, in at least one spatial direction and at a given time, of the wavefront to be analyzed (FO);

the wavefront analyzer breaking down the wavefront to be analyzed (FO) into a plurality of spots (TA) or fringes on a detector (DM);

wherein the correcting step includes correcting a computation of local phase gradients of the wavefront to be analyzed (FO) as a function of local intensity gradients of the wavefront to be analyzed (FO), and wherein the correcting of the computation is carried out according to a correction law, further comprising, before the detection of the signal from the wavefront to be analyzed (FO), determining the correction law comprising the following steps:

injecting, at an input of the wavefront analyzer, a wavefront that is substantially homogeneous in intensity and the phase of which is known (FOH), inserting, in front of the input of the wavefront analyzer, a mask (MA) the transmission of which is not spatially homogeneous, such that the homogeneous wavefront (FOH) passes through the mask (MA) before being broken down by the wavefront analyzer into a plurality of spots or fringes on the detector (DM), observing a position of each one of the spots or fringes obtained on the detector in the presence of the mask, and determining, from said observation, the correction law to apply for the computation of the local phase gradients of the wavefront to be analyzed (FO) as a function of the local intensity gradients of the wavefront to be analyzed (FO).

12. The process according to claim 11, further comprising, for the determination of the correction law, observing a position of each one of the spots (TA) or fringes obtained on the detector (DM) without the mask.

13. The process according to claim 11, wherein the observation of the position of a spot (TA) or fringe comprises determining a position of an energy barycentre (BA) of the spot or fringe on the detector (DM).

14. The process according to claim 11, wherein the wavefront analyzer is of the Shack-Hartmann or Hartmann-Shack type having an array (ML) of microlenses (L), the process further comprising repeating the determining of the correction law for several longitudinal positions, with respect to the detector, of a focusing plane of each spot.

15. A process for correcting a wavefront analyzer that detects a signal from an incident wavefront to be analyzed (FO), said signal thus detected providing local phase and intensity information on the wavefront to be analyzed, the process comprising:

correcting, with a correction module attached to and cooperating with the wavefront analyzer, a computation of a phase of the wavefront to be analyzed (FO) as a function of a local spatial intensity variation, in at least one spatial direction and at a given time, of the wavefront to be analyzed (FO);

the wavefront analyzer breaking down the wavefront to be analyzed (FO) into a plurality of spots (TA) or fringes on a detector (DM);

wherein the correcting step includes correcting a computation of local phase gradients of the wavefront to be analyzed (FO) as a function of local intensity gradients of the wavefront to be analyzed (FO), and wherein the wavefront analyzer is of the Shack-Hartmann or Hartmann-Shack type having an array (ML) of microlenses (L), the process further comprising:

mapping the local phase gradients of the wavefront to be analyzed (FO), mapping the local intensity gradients of the wavefront to be analyzed, determining, from said local phase gradients, a mapping of local phase curvatures of the wavefront to be analyzed, determining a longitudinal position of a focusing plane of each one of the spots (TA), and for each spot, correcting for the computation of the local phase gradients, from the longitudinal position of the focusing plane of the spot and from the mapping of the local intensity gradients in front of each microlens.

16. A process for correcting a wavefront analyzer that detects a signal from an incident wavefront to be analyzed (FO), said signal thus detected providing local phase and intensity information on the wavefront to be analyzed, the process comprising:

correcting, with a correction module attached to and cooperating with the wavefront analyzer, a computation of a phase of the wavefront to be analyzed (FO) as a function of a local spatial intensity variation, in at least one spatial direction and at a given time, of the wavefront to be analyzed (FO), producing a Fourier transform of the unprocessed detected signal, isolating the zero order of the Fourier transform, producing an inverse Fourier transform of said zero order in such a way as to obtain an intensity shape of the wavefront to be analyzed (FO), and dividing said unprocessed detected signal by said intensity shape.

17. A process for correcting a wavefront analyzer that detects a signal from an incident wavefront to be analyzed (FO), said signal thus detected providing local phase and intensity information on the wavefront to be analyzed, the process comprising:

correcting, with a correction module attached to and cooperating with the wavefront analyzer, a computation of a phase of the wavefront to be analyzed (FO) as a function of a spatial intensity variation of the wavefront to be analyzed (FO), producing a Fourier transform of the unprocessed detected signal, deconvoluting the first orders of the Fourier transform of the unprocessed signal by the zero order of the Fourier transform of the unprocessed signal, and reconstructing the wavefront to be analyzed (FO), corrected in terms of phase, from said deconvoluted first orders.

18. A process for correcting a wavefront analyzer that detects a signal from an incident wavefront to be analyzed (FO), said signal thus detected providing local phase and intensity information on the wavefront to be analyzed, the process comprising:

correcting, with a correction module attached to and cooperating with the wavefront analyzer, a computation of a phase of the wavefront to be analyzed (FO) as a function of a local spatial intensity variation, in at least one spatial direction and at a given time, of the wavefront to be analyzed (FO);

the wavefront analyzer breaking down the wavefront to be analyzed (FO) into a plurality of spots (TA) or fringes on a detector (DM), wherein the wavefront analyzer is of the Shack-Hartmann or Hartmann-Shack type having an array (ML) of microlenses (L), further comprising, before the detection of the signal from the wavefront to be analyzed (FO), optimizing the analyzer by:

injecting, at an input of the analyzer, a wavefront that is substantially homogeneous in intensity and phase of which is known (FOH), inserting, in front of the input of the analyzer, a mask (MA) the transmission of which is not spatially homogeneous, such that the homogeneous wavefront (FOH) passes through the mask before being broken down by the wavefront analyzer into a plurality of spots on the detector (DM), observing a position of each one of the spots (TA) obtained on the detector in the presence of the mask, withdrawing the mask (MA) from in front of the input of the wavefront analyzer, observing, without the mask, a position of each one of the spots obtained on the detector (DM), displacing the detector with respect to the array of microlenses, and repeating the preceding steps in order to minimize a difference in positions of the spots between the observation without the mask and the observation in the presence of the mask.

19. A wavefront analyzer that detects a signal from an incident wavefront to be analyzed (FO), said signal thus detected providing local phase and intensity information on the wavefront to be analyzed, the wavefront analyzer comprising:

means for calculating local spatial gradients of an intensity of the wave front to be analyzed, in at least one spatial direction and at a given time, each local spatial gradient of the intensity at a given spatial position being calculated from intensity values, taken at different spatial positions but only at the given time, of the wavefront to be analyzed;

means for correcting, with a correction module attached to and cooperating with the wavefront analyzer, a computation of a phase of the wavefront to be analyzed (FO) as a function of the local spatial gradients, at the given time, of the intensity of the wavefront to be analyzed, but not as a function of other local spatial gradients, at another time, of the intensity of the wavefront to be analyzed (FO).

* * * * *

UNITED STATES PATENT AND TRADEMARK OFFICE
CERTIFICATE OF CORRECTION

PATENT NO. : 8,725,447 B2
APPLICATION NO. : 12/445715
DATED : May 13, 2014
INVENTOR(S) : Levecq et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1188 days.

Signed and Sealed this
Twenty-ninth Day of September, 2015

Michelle K. Lee
*Director of the United States Patent and Trademark Office*